United States Patent
Osman et al.

(10) Patent No.: US 11,213,803 B2
(45) Date of Patent: *Jan. 4, 2022

(54) AMMONIA-FREE SYNTHESIS FOR AL OR SI BASED MULTIMETALLIC MATERIALS

(71) Applicant: UOP LLC, Des Plaines, IL (US)

(72) Inventors: Zara Osman, Glenview, IL (US); Wei Pan, Hoffman Estates, IL (US); Jaime G. Moscoso, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 210 days.

This patent is subject to a terminal disclaimer.

(21) Appl. No.: 16/420,083

(22) Filed: May 22, 2019

(65) Prior Publication Data

US 2020/0188884 A1 Jun. 18, 2020

Related U.S. Application Data

(60) Provisional application No. 62/779,279, filed on Dec. 13, 2018.

(51) Int. Cl.
*B01J 23/00* (2006.01)
*B01J 35/00* (2006.01)
(Continued)

(52) U.S. Cl.
CPC ........... *B01J 23/002* (2013.01); *B01J 23/883* (2013.01); *B01J 35/0006* (2013.01);
(Continued)

(58) Field of Classification Search
CPC .... B01J 23/002; B01J 35/0006; B01J 37/009; B01J 37/0009; B01J 37/04; B01J 37/20;
(Continued)

(56) References Cited

U.S. PATENT DOCUMENTS

| 4,820,677 A | 4/1989 | Jacobson et al. |
| 4,904,634 A | 2/1990 | Wieserman et al. |

(Continued)

FOREIGN PATENT DOCUMENTS

| CA | 2719157 A1 | 10/2009 |
| CA | 2620656 C | 3/2014 |

(Continued)

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.

(Continued)

*Primary Examiner* — Anthony J Zimmer
(74) *Attorney, Agent, or Firm* — Paschall & Associates, LLC; Mark Goldberg

(57) ABSTRACT

A highly active mixed transition metal oxide material has been developed. The material may be sulfided to generate metal sulfides which are used as a catalyst in a conversion process such as hydroprocessing. The hydroprocessing may include hydrodenitrification, hydrodesulfurization, hydrodemetallation, hydrodesilication, hydrodearomatization, hydroisomerization, hydrotreating, hydrofining, and hydrocracking.

18 Claims, 7 Drawing Sheets

(51) Int. Cl.
  *B01J 37/00* (2006.01)
  *B01J 37/04* (2006.01)
  *B01J 37/20* (2006.01)
  *B01J 23/883* (2006.01)
  *B01J 37/08* (2006.01)

(52) U.S. Cl.
  CPC ......... *B01J 37/009* (2013.01); *B01J 37/0009* (2013.01); *B01J 37/04* (2013.01); *B01J 37/08* (2013.01); *B01J 37/20* (2013.01); *B01J 2523/31* (2013.01); *B01J 2523/41* (2013.01); *B01J 2523/68* (2013.01); *B01J 2523/847* (2013.01)

(58) Field of Classification Search
  CPC .... B01J 23/883; B01J 37/08; B01J 2523/847; B01J 2523/31; B01J 2523/41; B01J 2523/68; B01J 31/0239; B01J 21/08; B01J 35/002; B01J 21/04; B01J 37/088
  See application file for complete search history.

(56) References Cited

U.S. PATENT DOCUMENTS

| | | | |
|---|---|---|---|
| 5,278,121 | A | 1/1994 | Singhal et al. |
| 6,156,695 | A | 12/2000 | Soled et al. |
| 6,162,350 | A | 12/2000 | Soled et al. |
| 6,197,273 | B1 | 3/2001 | Nagano et al. |
| 6,280,610 | B1 | 8/2001 | Uragami et al. |
| 6,299,760 | B1 | 10/2001 | Soled et al. |
| 6,534,437 | B2 | 3/2003 | Eijsbouts et al. |
| 6,582,590 | B1 | 6/2003 | Riley et al. |
| 6,620,313 | B1 | 9/2003 | Demmin et al. |
| 6,635,599 | B1 | 10/2003 | Eijsbouts et al. |
| 6,652,738 | B2 | 11/2003 | Eijsbouts et al. |
| 6,712,955 | B1 | 3/2004 | Hou et al. |
| 6,783,663 | B1 | 8/2004 | Riley et al. |
| 6,863,803 | B1 | 3/2005 | Riley et al. |
| 6,929,738 | B1 | 8/2005 | Riley et al. |
| 7,229,548 | B2 | 6/2007 | Riley et al. |
| 7,232,515 | B1 | 6/2007 | Demmin et al. |
| 7,232,934 | B2 | 6/2007 | Saleh et al. |
| 7,288,182 | B1 | 10/2007 | Soled et al. |
| 7,513,989 | B1 | 4/2009 | Soled et al. |
| 7,538,066 | B2 | 5/2009 | Soled et al. |
| 7,544,632 | B2 | 6/2009 | Soled et al. |
| 7,560,408 | B2 * | 7/2009 | Calemma ................ B01J 27/16 502/214 |
| 7,591,942 | B2 | 9/2009 | Soled et al. |
| 7,605,107 | B2 | 10/2009 | Soled et al. |
| 7,608,558 | B2 | 10/2009 | Eijsbouts et al. |
| 7,648,941 | B2 | 1/2010 | Soled et al. |
| 7,686,943 | B2 | 3/2010 | Soled et al. |
| 7,691,257 | B2 | 4/2010 | Shih et al. |
| 7,709,412 | B2 | 5/2010 | Shih et al. |
| 7,749,937 | B2 | 7/2010 | Domokos et al. |
| 7,776,205 | B2 | 8/2010 | Soled et al. |
| 7,780,845 | B2 | 8/2010 | Soled et al. |
| 7,951,746 | B2 | 5/2011 | Bai et al. |
| 8,062,508 | B2 | 11/2011 | Soled et al. |
| 8,067,331 | B2 | 11/2011 | Eijsbouts-Spickova et al. |
| 8,080,492 | B2 | 12/2011 | Kuperman et al. |
| 8,173,570 | B2 | 5/2012 | Maesen et al. |
| 8,206,575 | B2 | 6/2012 | Maesen et al. |
| 8,216,958 | B2 | 7/2012 | Wu et al. |
| 8,318,628 | B2 | 11/2012 | Brun et al. |
| 8,343,887 | B2 | 1/2013 | Maesen et al. |
| 8,377,289 | B2 | 2/2013 | Li et al. |
| 8,383,543 | B2 | 2/2013 | Maesen et al. |
| 8,586,500 | B2 | 11/2013 | Kuperman et al. |
| 8,636,967 | B2 | 1/2014 | Canelon et al. |
| 8,846,560 | B2 | 9/2014 | Yang et al. |
| 9,278,339 | B2 * | 3/2016 | Bellussi ................ B01J 35/1038 |
| 2007/0060472 | A1 * | 3/2007 | Fisher ................ B01J 37/0232 502/232 |
| 2008/0280754 | A1 | 11/2008 | Toledo Antonio et al. |
| 2009/0114566 | A1 | 5/2009 | Chen et al. |
| 2012/0065056 | A1 | 3/2012 | Domokos et al. |
| 2012/0122653 | A1 | 5/2012 | Maesen et al. |
| 2012/0122659 | A1 | 5/2012 | Kuperman et al. |
| 2012/0172199 | A1 | 7/2012 | Yang et al. |
| 2013/0068662 | A1 | 3/2013 | Maesen et al. |
| 2013/0337996 | A1 | 12/2013 | Eijsbouts-Spickova et al. |
| 2014/0027350 | A1 | 1/2014 | Soled et al. |
| 2015/0292095 | A1 | 10/2015 | Haber et al. |
| 2017/0165644 | A1 | 6/2017 | Miller et al. |
| 2017/0165645 | A1 | 6/2017 | Miller et al. |
| 2017/0165646 | A1 | 6/2017 | Miller et al. |
| 2017/0165647 | A1 | 6/2017 | Miller et al. |
| 2017/0165648 | A1 | 6/2017 | Miller et al. |
| 2017/0165649 | A1 | 6/2017 | Miller et al. |
| 2017/0165650 | A1 | 6/2017 | Miller et al. |
| 2017/0165651 | A1 | 6/2017 | Miller et al. |
| 2017/0165652 | A1 | 6/2017 | Miller et al. |
| 2017/0165656 | A1 | 6/2017 | Miller et al. |
| 2017/0166605 | A1 | 6/2017 | Miller et al. |
| 2017/0218528 | A1 | 8/2017 | Zhang et al. |
| 2018/0169633 | A1 | 6/2018 | Millet et al. |
| 2019/0060873 | A1 | 2/2019 | Millet et al. |
| 2019/0060882 | A1 | 2/2019 | Miller et al. |

FOREIGN PATENT DOCUMENTS

| | | | |
|---|---|---|---|
| CN | 102049265 | A | 5/2011 |
| CN | 101306374 | B | 1/2012 |
| EP | 2103347 | A1 | 9/2009 |
| RU | 2098181 | C1 | 12/1997 |
| WO | 200042126 | A1 | 7/2000 |
| WO | 2009061295 | A1 | 5/2009 |
| WO | 2014033653 | A2 | 3/2014 |

OTHER PUBLICATIONS

An, "Preparation of unsupported and mesoporous Ni—Mo—W sulfide catalysts by low temperature solid-state reaction", Journal of China University of Petroleum (Edition of Natural Science), v 31, n 6, p. 156-160, Dec. 2007, ISSN 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014 ISSN: 09205861; DOI: 10.1016/j.cattod.2013.06.002; Publisher: Elsevier.

Escobar, "Effect of ethylene glycol addition on the properties of P-doped NiMo/Al2O3 HDS catalysts: Part I. Materials preparation and characterization", Applied Catalysis B: Environmental, v 88, n 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study of Mo (Or W)—Co, Mo (Or W)—Ni, and Mo (Or W)—Ca Sulfided Phases", J. Catal., v 102, n 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chem. 1996, 35, 4191-4197.

Nava, "Effect of phosphorus addition on unsupported Ni—Mo—W sulfide catalysts prepared by the in situ activation of nickel/tetramethylammonium thiomolybdotungstate", Applied Catalysis A: General, v 303, n 2, p. 177-184, Apr. 28, 2006; ISSN: 0926860X; DOI: 10.1016/j.apcata.2005.12.025; Publisher: Elsevier.

Nikulshin, "Influence of nature of precursors of aluminum nickel molybdenum catalysts on their performance in nydrodesulfurization", Neftekhimiya, v 46, n 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 60, n 4, p. 372-374, Aug. 2005; ISSN: 05693799; Publisher: American Chemical Society.

(56) References Cited

OTHER PUBLICATIONS

Yin, "A novel porous ammonium nickel molybdate as the catalyst precursor towards deep hydrodesulfurization of gas oil", p. 873-878, 2013, ISSN: 0016-2361, Publisher: Elsevier Science.

Yin, "Mechanism of Hydrodesulfurization of dibenzothiophenes on unsupported NiMoW catalyst", Journal of Fuel Chemistry and Technology, v 41, n 8, p. 991-997, Aug. 2013; ISSN: 18725813; DOI: 10.1016/S1872-5813(13) 60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

Clearfield, "Studies in Heavy-Metal Molybdates. I. Crystal Structure of a Basic Zinc Molybdate, NaZn2OH(H20) (Mo04)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni—Co—Mo oxy-hydroxide nanoflakes grown on carbon cloth for excellent supercapacitor electrodes", Materials Letters 208 (2017) 65-68.

Hsu, "Synthesis and characterization of mesoporous Ni—Co oxy-hydroxides for pseudocapacitor application", Electrochimica Acta 94 (2013) 104-112.

Lien, "High-performance asymmetric supercapacitor consisting of Ni—Co—Cu oxy-hydroxide nanosheets and activated carbon". Electrochemistry Communications 34 (2013) 323-326.

Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.

U.S. Appl. No. 16/189,057 Crystalline Oxy-Hydroxide Transition Metal Molybdotungstate, Millet et al., filed Nov. 30, 2018.

U.S. Appl. No. 16/189,501 Mixed Transition Metal Tungstate, Millet et al., filed Nov. 13, 2018.

U.S. Appl. No. 16/206,837 Highly Active Quaternary Metallic Materials Using Short-Chain Alkyl Quaternary Ammonium Compounds, Osman et al., filed Nov. 30, 2018.

U.S. Appl. No. 16/206,924 Chighly Active Quaternary Metallic Materials Using Short-Chain Alkyl Quaternary Ammonium Compounds, Osman et al., filed Nov. 30, 2018.

U.S. Appl. No. 16/198,613 Highly Active Trimetallic Materials Using Short-Chain Alkyl Quaternary Ammonium Compounds, Pan et al., filed Nov. 21, 2018.

U.S. Appl. No. 16/206,804 Highly Active Trimetallic Materials Using Short-Chain Alkyl Quaternary Ammonium Compounds, Osman et al., filed Nov. 30, 2018.

U.S. Appl. No. 16/206,898 Highly Active Multimetallic Materials Using Short-Chain Alkyl Quaternary Ammonium Compounds, Osman et al., filed Nov. 30, 2018.

* cited by examiner

AMMONIA-FREE SYNTHESIS FOR AL OR SI BASED MULTIMETALLIC MATERIALS

CROSS-REFERENCE TO RELATED APPLICATION

This application claims priority from Provisional Application No. 62/779,279 filed Dec. 13, 2018, the contents of which cited application are hereby incorporated by reference in its entirety.

FIELD OF THE INVENTION

This invention relates to a new catalyst or catalyst precursor. More particularly this invention relates to a novel mixed transition metal oxide and its use as a catalyst or catalyst precursor such as a hydrocarbon conversion catalyst or catalyst precursor or specifically a hydroprocessing catalyst or catalyst precursor. The hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

Currently there are two main drivers for refiners to invest in hydroprocessing technology. The first being environmental regulations imposing more stringent specifications on fuels including gasoline, diesel, and even fuel oils. For example, permitted sulfur and nitrogen levels in fuels are significantly lower than one decade ago. A second driving force is the quality of crude oils. More refineries are facing crude oils containing higher concentrations of sulfur and nitrogen compounds which are difficult to process or remove by conventional processes. Without new technology, refiners resort to increasing the severity of hydrotreating processes either by increasing the reactor temperatures or decreasing space velocity through the reactor. Increasing reactor temperature has the drawback of shortening catalyst lifetime. Decreasing space velocity, through increasing reactor size or decreasing feed flow rates, has the drawback of overhauling the reactors or significantly reducing production rates. Therefore, a highly active hydroprocessing catalyst is needed. A highly active hydroprocessing catalyst helps the refiners meet the stringent fuel sulfur and nitrogen limitations without significant investment in reactors and equipment and while maintaining production rates.

In the early 2000s, unsupported, also called "bulk", hydrotreating catalysts were applied in commercial hydrotreating processes. These catalysts were claimed to have several times more activity than conventional supported NiMo or CoMo hydrotreating catalysts based on the same loading volumes. However, to achieve the high activity, the unsupported hydrotreating catalysts often contained significantly more metal content than the conventional supported hydrotreating catalysts. Increased metal content means the cost of the catalyst is also increased. Thus, there is a need in the industry for an unsupported catalyst with better intrinsic activity per mass. An unsupported catalyst with higher intrinsic activity per mass will require less metal loading to achieve the same activity as the unsupported catalyst with less intrinsic activity at the same loading volumes. One way of improving the intrinsic activity of unsupported catalyst is by mixing materials such as Al or Si with NiMoW during the synthesis. The intrinsic activity of an unsupported catalyst is improved when Al or Si containing NiMoW has the similar activity as NiMoW-only materials on the weight basis.

U.S. Pat. No. 6,156,695 described a Ni—Mo—W mixed metal oxide material. The XRD pattern of this material was shown to be largely amorphous with only two crystalline peaks, the first at d=2.53 Angstroms and the second at d=1.70 Angstroms. U.S. Pat. No. 6,534,437 described a process for preparing a catalyst comprising bulk catalyst particles having at least one Group VIII non-noble metal and at least two Group VIB metals. The metal components were stated to be at least partly in the solid state during the material synthesis reaction with solubility of less than 0.05 mol/100 ml water at 18° C. U.S. Pat. No. 7,544,632 showed a bulk multi-metallic catalyst composition containing quaternary ammonium, [$CH_3(CH_2)_dN(CH_3)_3$], where d is an integer from about 10 to about 40. U.S. Pat. No. 7,686,943 described a bulk metal catalyst comprising metal oxidic particles containing niobium as a Group V metal, a single Group VIB metal, and a single Group VIII metal. U.S. Pat. No. 7,776,205 described a bulk metal catalyst comprising a single Group VIB metal, a Group VB metal, and a Group VIII metal.

U.S. Pat. No. 8,173,570 showed co-precipitation to form at least a metal compound in solution selected from Group VIII, at least two Group VIB metal compounds in solution, and at least one organic oxygen containing chelating ligand in solution. The organic oxygen containing ligand has an LD50 rate larger than 700 mg/kg. U.S. Pat. No. 7,803,735 showed forming an unsupported catalyst precursor by co-precipitating at least one of a Group VIB metal compound, at least a metal compound selected from Group VIII, Group IIB, Group IIA, Group IVA, and combinations thereof, and at least one of an organic oxygen-containing ligand.

CN 101306374 described a catalyst of at least one Group VIII metal, at least two Group VIB metals and an organic additive. The organic additive is selected from organic ammonium compounds with the formula of $C_nH_{2n+1}N(Me)_3X$ or $(C_nH_{2n+1})_4NX$ where n=2-20 and X denotes Cl, Br, or OH. The XRD provided shows peaks at d=11.30+/−1.5 Angstroms, d=4.15+/−0.5 Angstroms, d=2.60+/−0.5 Angstroms, and d=1.53+/−0.5 Angstroms.

Unsupported NiZnMoW materials have been discussed in Applied Catalysis A: General 474 (2014) page 60-77. The material was synthesized in two steps. The first step prepared layered NiZn hydroxides. The second step prepared the NiZnMoW material via the reaction of layered NiZn hydroxide and solution containing $MoO_4^{2-}$ and $WO_4^{2-}$.

There is a need for new materials to meet increasing demands of conversion processes including the need for catalysts with higher intrinsic activity per mass. The material disclosed herein is unique and novel in elemental composition as compared to previous materials.

SUMMARY OF THE INVENTION

A novel mixed transition metal oxide material has been produced and optionally sulfided, to yield an active catalyst such as a hydroprocessing catalyst. The novel mixed transition metal oxide material has the formula:

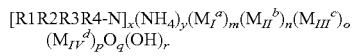

where: $M_I$ is a metal or mixture of metals selected from Group IB (IUPAC Group 11), Group IIB (IUPAC Group 12), Group VIIB (IUPAC Group 7), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is an element selected from Group IIIA (IUPAC Group 13) or Group IVA (IUPAC Group 14); [R1 R2 R3 R4-N] is a tetra-alkyl ammonium cation with one positive charge, where R1, R2, R3 and R4 are alkyl groups having from 1 to 6 carbon atoms such as methyl, ethyl, propyl, butyl, pentyl, and hexyl, and R1, R2, R3 and R4 can be the same or different from each other. $NH_4$ is an ammonium cation with one positive charge. OH and O are hydroxide anion and oxygen anion with one or two negative charges, respectively. a, b, c, and d are the valence states of $M_I$, $M_{II}$, $M_{III}$, and $M_{IV}$; x, y, m, n, o, p, q, and r are the mole ratio of [R1 R2 R3 R4-N] cation, $NH_4$ cation, $M_I$, $M_{II}$, $M_{III}$, $M_{IV}$, O, and OH anion, wherein m/(m+n)≥0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

The material is further characterized by an X-ray diffraction pattern, which is essentially amorphous with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein all the said peaks have a full width at half maximum greater than 0.75°.

Patterns presented herein in tabular form or as patterns were obtained using standard X-ray powder diffraction techniques. The radiation source was a high-intensity, X-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. The intensity of each peak was determined by the peak height after subtracting background. To prevent errors in peak deconvolution, the background is taken to be linear in the range delimiting the broad diffraction features, 6-2 Å. $I_o$ is the intensity of the peak at 2θ of 32.0-41.50 if $M_{IV}$ is Al or the intensity of the peak at 2θ of 32.0-36.5° if $M_{IV}$ is Si. I/I$_o$ is the ratio of the intensity of a peak to $I_o$. In terms of 100(I/I$_o$), the above designations are defined as: vw=0-5, w=5-20, m=20-60, s=60-80, and vs=80-100. It is known to those skilled in the art, the noise/signal ratio in XRD depends on scan conditions. Sufficient scan time is required to minimize noise/signal ratio to measure peak intensities.

Another embodiment involves a method of making a mixed transition metal oxide material has been produced and optionally sulfided, to yield an active catalyst such as a hydroprocessing catalyst. The novel mixed transition metal oxide material has the formula:

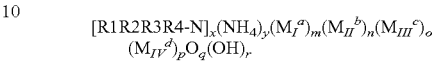

where: $M_I$ is a metal or mixture of metals selected from Group IB (IUPAC Group 11), Group IIB (IUPAC Group 12), Group VIIB (IUPAC Group 7), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is an element selected from Group IIIA (IUPAC Group 13) or Group IVA (IUPAC Group 14); [R1 R2 R3 R4-N] is a tetra-alkyl ammonium cation with one positive charge, where R1, R2, R3 and R4 are alkyl groups having from 1 to 6 carbon atoms such as methyl, ethyl, propyl, butyl, pentyl, and hexyl, and R1, R2, R3 and R4 can be the same or different from each other. $NH_4$ is an ammonium cation with one positive charge. OH and O are hydroxide anion and oxygen anion with one or two negative charges, respectively. a, b, c, and d are the valence states of $M_I$, $M_{II}$, $M_{III}$, and $M_{IV}$; x, y, m, n, o, p, q, and r are the mole ratio of [R1 R2 R3 R4-N] cation, $NH_4$ cation, $M_I$, $M_{II}$, $M_{III}$, $M_{IV}$, O, and OH anion, wherein m/(m+n)≥0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

The material is further characterized by an X-ray diffraction pattern, which is essentially amorphous with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein all the said peaks have a full width at half maximum greater than 0.750 and wherein the method comprises: adding sources of $M_I$, $M_{II}$, $M_{III}$, and $M_{IV}$, and at least one short-chain alkyl quaternary ammonium hydroxide compound without additional $NH_3.H_2O$ or other basic solution, the quaternary ammonium hydroxide compound having the formula [R1 R2 R3 R4-N]OH, where R1, R2, R3 and R4 are alkyl groups having 1 to 6 carbon atoms such as methyl, ethyl, propyl, butyl, pentyl, and hexyl, and where R1, R2, R3 and R4 can be the same or different from each other. A protic solvent may optionally be added as well; optionally mixing the reaction mixture; reacting the reaction mixture at a temperature from about 25° C. to about 200° C. for a period of time from about 30 minutes to 200 hours to generate the mixed transition metal oxide material; and recovering the mixed transition metal oxide material. The recovery may be by decanting, filtration or centrifugation, with or without washing of the recovered product with a protic solvent. A binder may be incorporated during the reaction or may be added to the recovered material. The binder is selected from aluminas, silicas, alumina-silicas, titanias, zirconias, natural clays, synthetic clays, and mixtures thereof. The recovered mixed transition metal oxide material may be sulfided. The reaction is conducted under atmospheric pressure or autogenous pressure. Mixing is optional and may occurring during the adding, during the reacting or both. Mixing, if used, may be intermittent or continuous.

Yet another embodiment involves a conversion process comprising contacting a sulfiding agent with a material to generate metal sulfides which are contacted with a feed at conversion conditions to generate at least one product, the material comprising a mixed transition metal oxide material has been produced and optionally sulfided, to yield an active catalyst such as a hydroprocessing catalyst. The novel mixed transition metal oxide material has the formula:

$$[R1R2R3R4\text{-}N]_x(NH_4)_y(M_I^a)_m(M_{II}^b)_n(M_{III}^c)_o(M_{IV}^d)_pO_q(OH)_r$$

where: $M_I$ is a metal or mixture of metals selected from Group IB (IUPAC Group 11), Group IIB (IUPAC Group 12), Group VIIB (IUPAC Group 7), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is an element selected from Group IIIA (IUPAC Group 13) or Group IVA (IUPAC Group 14); [R1 R2 R3 R4-N] is a tetra-alkyl ammonium cation with one positive charge, where R1, R2, R3 and R4 are alkyl groups having from 1 to 6 carbon atoms such as methyl, ethyl, propyl, butyl, pentyl, and hexyl, and R1, R2, R3 and R4 can be the same or different from each other. $NH_4$ is an ammonium cation with one positive charge. OH and O are hydroxide anion and oxygen anion with one or two negative charges, respectively. a, b, c, and d are the valence states of $M_I$, $M_{II}$, $M_{III}$, and $M_{IV}$; x, y, m, n, o, p, q, and r are the mole ratio of [R1 R2 R3 R4-N] cation, $NH_4$ cation, $M_I$, $M_{II}$, $M_{III}$, $M_{IV}$, O, and OH anion, wherein m/(m+n)≥0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

The material is further characterized by an X-ray diffraction pattern, which is essentially amorphous with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein all the said peaks have a full width at half maximum greater than 0.75°.

The conversion process may be a hydrocarbon conversion process. The conversion process may be hydroprocessing. The conversion process may be hydrodenitrification, hydrodesulfurization, hydrodemetallation, hydrodesilication, hydrodearomatization, hydroisomerization, hydrotreating, hydrofining, or hydrocracking. The mixed transition metal oxide material may be present in a mixture with at least one binder and wherein the mixture comprises up to about 80 wt % binder.

Additional features and advantages of the invention will be apparent from the description of the invention and claims provided herein.

DETAILED DESCRIPTION OF THE INVENTION

Figure 1:
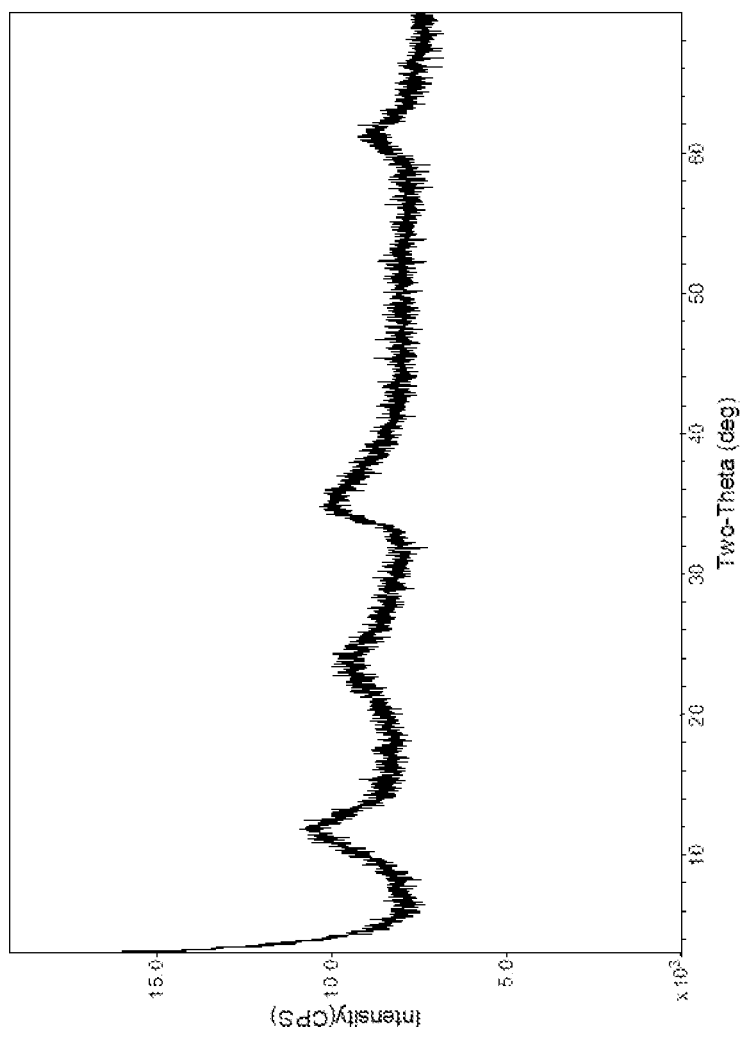
FIG. 1 is an XRD pattern of the material of example 1.

The present invention relates to a novel mixed transition metal oxide material, a process for preparing the material, and a process using the material. The material has an empirical formula:

$$[R1R2R3R4\text{-}N]_x(NH_4)_y(M_I^a)_m(M_{II}^b)_n(M_{III}^c)_o(M_{IV}^d)_pO_q(OH)_r$$

where: $M_I$ is a metal or mixture of metals selected from Group IB (IUPAC Group 11), Group IIB (IUPAC Group 12), Group VIIB (IUPAC Group 7), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is an element selected from Group IIIA (IUPAC Group 13) or Group IVA (IUPAC Group 14); [R1 R2 R3 R4-N] is a tetra-alkyl ammonium cation with one positive charge, where R1, R2, R3 and R4 are alkyl groups having from 1 to 6 carbon atoms such as methyl, ethyl, propyl, butyl, pentyl, and hexyl, and R1, R2, R3 and R4 can be the same or different from each other. $NH_4$ is an ammonium cation with one positive charge. OH and O are hydroxide anion and oxygen anion with one or two negative charges, respectively. a, b, c, and d are the valence states of $M_I$, $M_{II}$, $M_{III}$, and $M_{IV}$; x, y, m, n, o, p, q, and r are the mole ratio of [R1 R2 R3 R4-N] cation, $NH_4$ cation, $M_I$, $M_{II}$, $M_{III}$, $M_{IV}$, O, and OH anion, wherein m/(m+n)≥0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

The material is further characterized by an X-ray diffraction pattern, which is essentially amorphous with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein all the said peaks have a full width at half maximum greater than 0.75°.

Although $M_I$ is a metal or mixture of metals selected from Group IB (IUPAC Group 11), Group IIB (IUPAC Group 12), Group VIIB (IUPAC Group 7), and Group IVB (IUPAC Group 4), in one embodiment, $M_I$ may be selected from Zr, Mn, Cu, Zn, and any mixture thereof. Although $M_{II}$ is a metal or a mixture of metals selected from Group VIII (IUPAC Groups 8, 9, and 10), in one embodiment $M_{II}$ may be selected from Fe, Co, Ni, and any mixture thereof. Although $M_{III}$ is a metal selected from Group VIB (IUPAC Group 6) in one embodiment, $M_{III}$ is selected from Cr, Mo, and W. Although $M_{IV}$ is an element selected from Group IIIA (IUPAC Group 13) and Group IVA (IUPAC Group 14), in one embodiment, $M_{IV}$ is selected from Al and Si.

The novel mixed transition metal oxide material can be prepared by co-precipitation by adding sources of the transition metals with one or more alkyl quaternary ammonium hydroxide compounds without using $NH_3 \cdot H_2O$ or other basic solution. A protic solvent may be used as well. The term "metal" as used herein is meant to refer to the element and not meant to necessarily indicate a metallic form.

Sources of $M_I$ include, but are not limited to, the respective halide, sulfide, acetate, nitrate, carbonate, sulfate, oxalate, thiols, hydroxide salts, and oxides of $M_I$. Specific examples of sources of $M_I$ include, but are not limited to, manganese nitrate, manganese chloride, manganese bromide, manganese sulfate, manganese carbonate, manganese sulfide, manganese hydroxide, manganese oxide, zirconium nitrate, zirconium oxychloride, zirconium bromide, zirconium sulfate, zirconium basic carbonate, zirconium hydroxide, zirconium oxide, copper nitrate, copper chloride, copper bromide, copper sulfate, copper carbonate, copper acetate, copper oxalate, copper sulfide, copper hydroxide, copper oxide, zinc nitrate, zinc chloride, iron bromide, zinc sulfate, zinc carbonate, zinc acetate, zinc oxalate, zinc sulfide, zinc hydroxide, zinc oxide, and any mixture thereof.

Sources of $M_{II}$ include, but are not limited to, the respective halide, sulfide, acetate, nitrate, carbonate, sulfate, oxalate, thiols, hydroxide salts, and oxides of $M_{II}$. Specific examples of sources of $M_{II}$ include, but are not limited to, nickel chloride, nickel bromide, nickel nitrate, nickel acetate, nickel carbonate, nickel hydroxide, cobalt chloride, cobalt bromide, cobalt nitrate, cobalt acetate, cobalt carbonate, cobalt hydroxide, cobalt sulfide, nickel chloride, cobalt oxide, nickel bromide, nickel nitrate, nickel acetate, nickel carbonate, nickel hydroxide, nickel sulfide, nickel oxide, iron acetate, iron oxalate, iron nitrate, iron chloride, iron bromide, iron sulfate, iron carbonate, iron acetate, iron oxalate, iron sulfide, iron oxide, and any mixture thereof.

Sources of $M_{III}$ include, but are not limited to, the respective oxides of $M_{III}$, sulfides of $M_{III}$, halides of $M_{III}$, molybdates, tungstates, thiolmolybdates, and thioltungstates. Specific examples of sources of $M_{III}$ include, but are not limited to, molybdenum trioxide, ammonium dimolybdate, ammonium thiomolybdate, ammonium heptamolybdate, sodium dimolybdate, sodium thiomolybdate, sodium heptamolybdate, potassium dimolybdate, potassium thiomolybdate, potassium heptamolybdate, molybdenum sulfide, tungsten trioxide, tungstic acid, tungsten oxytetrachloride, tungsten hexachloride, hydrogen tungstate, ammonium ditungstate, sodium ditungstate, ammonium metatungstate, ammonium paratungstate, sodium metatungstate, sodium paratungstate, and any mixture thereof.

Sources of $M_{IV}$ include, but are not limited to, aluminum chloride, aluminum bromide, aluminum fluoride, aluminum nitrate, ammonium aluminum sulfate, aluminum tri-sec-butoxide, aluminum tert-butoxide, aluminum isopropoxide, aluminum ethoxide, aluminum acetylacetonate, sodium silicate, tetra-alkyl orthosilicate, silica hydrogel, colloidal silica, silica hydroxide, fumed silica, silicic acid, and any mixtures thereof.

The short-chain alkyl quaternary ammonium hydroxide compound is selected from compounds having the formula [R1 R2 R3 R4-N]OH, where R1, R2, R3 and R4 are alkyl groups having from 1 to 6 carbon atoms such as methyl, ethyl, propyl, butyl, pentyl, and hexyl, and R1, R2, R3 and R4 can be the same or different from each other. Specific examples of short-chain alkyl quaternary ammonium hydroxide compounds include, but are not limited to, tetra methyl ammonium hydroxide, tetra ethyl ammonium hydroxide, tetra propyl ammonium hydroxide, tetra butyl ammonium hydroxide, tetra pentyl ammonium hydroxide, tri-butyl methyl ammonium hydroxide, tri-propyl methyl ammonium hydroxide, tri-ethyl methyl ammonium hydroxide, di-propyl di-methyl ammonium hydroxide, butyl tri-methyl ammonium hydroxide, and any mixture thereof.

The material of this invention can be prepared by co-precipitation by adding the sources of transition metals to at least one alkyl quaternary ammonium hydroxide compound. The resulting reaction mixture may be a slurry. In one embodiment, the sources of the transition metals are added to the at least one quaternary ammonium hydroxide compound, and in this embodiment, mixing is optional. Optionally, a protic solvent may be added as well Suitable protic solvents include water and alcohols such as ethanol, isopropanol, butanol, and glycol. In other embodiments, the reaction mixture may be formed by adding the components of the reaction mixture in any order and in any combination and as a variety of solutions. In one embodiment, the sources of $M_I$, $M_{II}$, $M_{III}$, and $M_{IV}$ may be in one or more solutions prior to forming the reaction mixture. In one embodiment, sources or solutions of $M_I$, $M_{II}$, $M_{III}$, and $M_{IV}$ may be mixed with protic solvent, an alkyl quaternary ammonium hydroxide solution, or any of the above prior to combination to form the reaction mixture. In another embodiment, the prepared $M_I$, $M_{II}$, $M_{III}$, and $M_{IV}$ solutions can be added into protic solution and an alkyl quaternary ammonium hydroxide solution added to the protic solution to form the reaction mixture. In yet another embodiment, solutions of sources of $M_I$, $M_I$, $M_{III}$, and $M_{IV}$ in protic solvent can be added simultaneously together with an alkyl quaternary ammonium hydroxide solution to form the reaction mixture. In one embodiment, the pH does not need to be adjusted.

The reaction mixture, which may be a slurry, is then reacted at temperature in the range of about 25° C. to about 200° C., or from about 60° C. to about 180° C., or from about 80° C. to about 150° C. in a sealed autoclave reactor or in a reactor open to ambient pressure. The sealed autoclave reactor or the reactor open to ambient pressure can be equipped with a stirring device to mix the reaction mixture. In another embodiment, the sealed autoclave or the reactor open to the ambient pressure does not have a stirring device and the reaction is conducted at a static state unless the temperature of the reaction mixture is higher than boiling point of the mixture, causing autonomous stirring by the boiling of the reaction mixture. In embodiment where a reactor open to ambient pressure is employed, a reflux device can be optionally attached to the reactor to avoid solvent loss when the reaction temperature is close to or above the boiling temperature of the reaction mixture.

The reaction time may range from about 0.5 to about 200 h, or 0.5 h to about 100 h, or from about 1 h to about 50 h, or from about 2 h to about 24 h. Optionally, the reaction mixture may be mixed continuously or intermittently during the reaction. In one embodiment, the reaction mixture is mixed every few hours. The mixed transition metal oxide material is recovered from the slurry.

In a specific embodiment, the mixed transition metal oxide material may be present in a composition along with a binder, where the binder may be, for example, silicas, aluminas, silica-aluminas, titanias, zirconias, natural clays, synthetic clays, and mixtures thereof. The selection of binder includes but is not limited to, anionic and cationic clays such as hydrotalcites, pyroaurite-sjogrenite-hydrotalcites, montmorillonite and related clays, kaolin, sepiolites, silicas, aluminas such as (pseudo) boehomite, gibbsite, flash calcined gibbsite, eta-alumina, zirconia, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk mixed transition metal oxide material, or may be incorporated during synthesis. The amount of binder may range from about 1 to about 80 wt % of the finished composition, or from about 1 to about 30 wt % of the finished composition, or from about 5 to about 26 wt % of the finished composition. The binder may be chemically bound to the mixed transition metal oxide material, or may be present in a physical mixture with the novel mixed transition metal oxide material. The mixed transition metal oxide material maybe extruded or pelletized with or without a binder.

At least a portion of the mixed transition metal oxide material, with or without a binder, or before or after inclusion of a binder, can be sulfided in situ in an application or pre-sulfided to form metal sulfides which in turn are used in an application. The sulfidation may be conducted under a variety of sulfidation conditions such as through contact of the mixed transition metal oxide material with a sulfur containing stream or feedstream as well as the use of a gaseous mixture of $H_2S/H_2$. The sulfidation of the mixed transition metal oxide material is performed at elevated temperatures, typically ranging from 50 to 600° C., or from 150 to 500° C., or from 250 to 450° C. The sulfiding step can take place at a location remote from other synthesis steps, remote from the location of the application where the mixed transition metal oxide material will be used, or remote from both the location of synthesis and remote from location of use. The materials resulting from the sulfiding step are referred to as metal sulfides which can be used as catalysts in conversion processes.

As discussed, at least a portion of the mixed transition metal oxide material of this invention can be sulfided and the resulting metal sulfides used as catalysts in conversion processes such as hydrocarbon conversion processes. Hydroprocessing is one class of hydrocarbon conversion processes in which the mixed transition metal oxide material is useful as a catalyst. Examples of specific hydroprocessing processes are well known in the art and include hydrodenitrification, hydrodesulfurization, hydrodemetallation, hydrodesilication, hydrodearomatization, hydroisomerization, hydrotreating, hydrofining, and hydrocracking. In one embodiment, a conversion process comprises contacting the mixed transition metal oxide material with a sulfiding agent to generate metal sulfides which are contacted with a feed stream at conversion conditions to generate at least one product.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Contact time for the feed and the active catalyst, referred to as liquid hourly space velocities (LHSV), should be in the range of about 0.1 $h^{-1}$ to about 10 $h^{-1}$, or about 0.25 $h^{-1}$ to about 8.0 $h^{-1}$. Specific subsets of these ranges may be employed depending upon the feedstock being used. For example, when hydrotreating a typical diesel feedstock, operating conditions may include from about 3.5 MPa to about 8.6 MPa, from about 315° C. to about 410° C., from about 0.25 $h^{-1}$ to about 5 $h^{-1}$, and from about 84 $Nm^3$ $H_2/m^3$ to about 850 $Nm^3$ $H_2/m^3$ feed. Other feedstocks may include gasoline, naphtha, kerosene, gas oils, distillates, and reformate.

Examples are provided below to describe the invention more completely. These examples are only by way of illustration and should not be interpreted as a limitation of the broad scope of the invention, which is set forth in the claims.

Example 1

31.97 g of TMAOH and 1.98 g of aluminum-sec-butoxide were set to stir in a beaker. Then, a solution containing 6.88 g ammonium heptamolybdate (AHM), 11.33 g nickel nitrate, and 107.91 g de-ionized water was added. The resulting slurry was stirred and digested at 100° C. for 22 h. The XRD-pattern of material generated in this example is shown in FIG. 1.

Example 2

Figure 2:
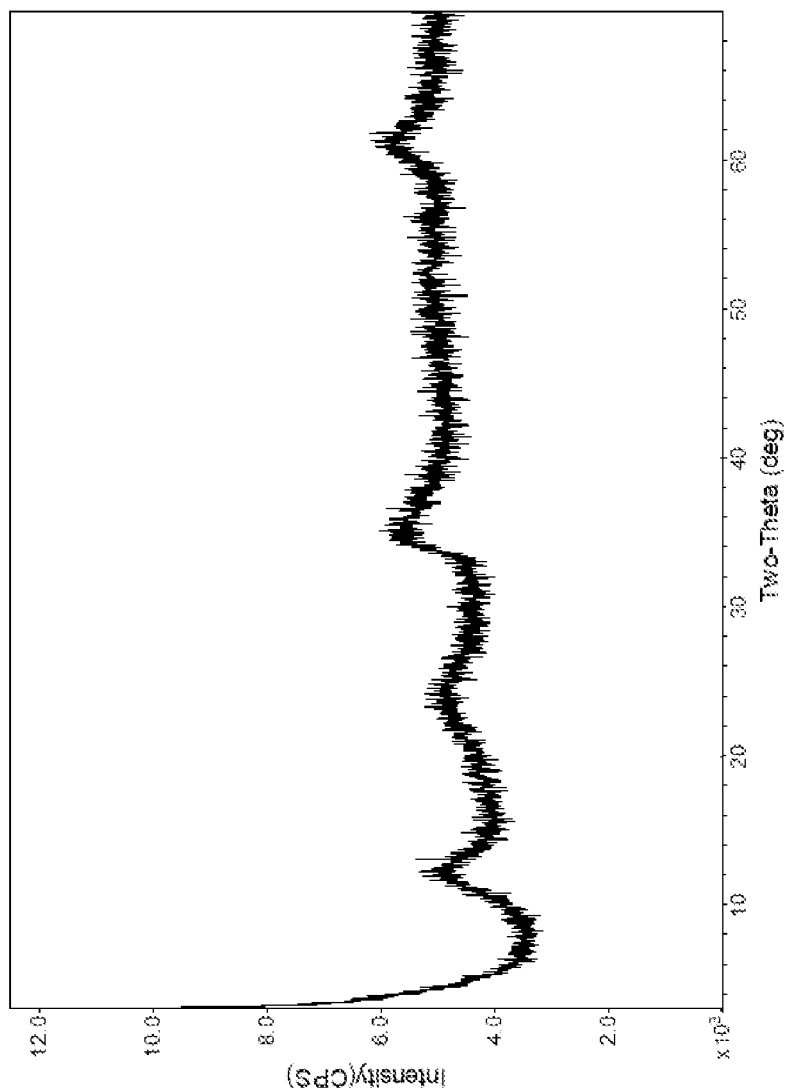
FIG. 2 is an XRD pattern of the material of example 2.

719.23 g of TMAOH and 44.53 g of aluminum-sec-butoxide were set to stir in a beaker. Then, a solution containing 154.79 g AHM, 254.87 g nickel nitrate, and 2427.93 g de-ionized water was added. The resulting slurry was stirred and digested at 100° C. for 24 h. The composition of this material was 4.66% Al, 43.3% Ni, 26% Mo, and 16.6% LOI from ICP. The XRD-pattern of material generated in this example is shown in FIG. 2.

Example 3

Figure 3:
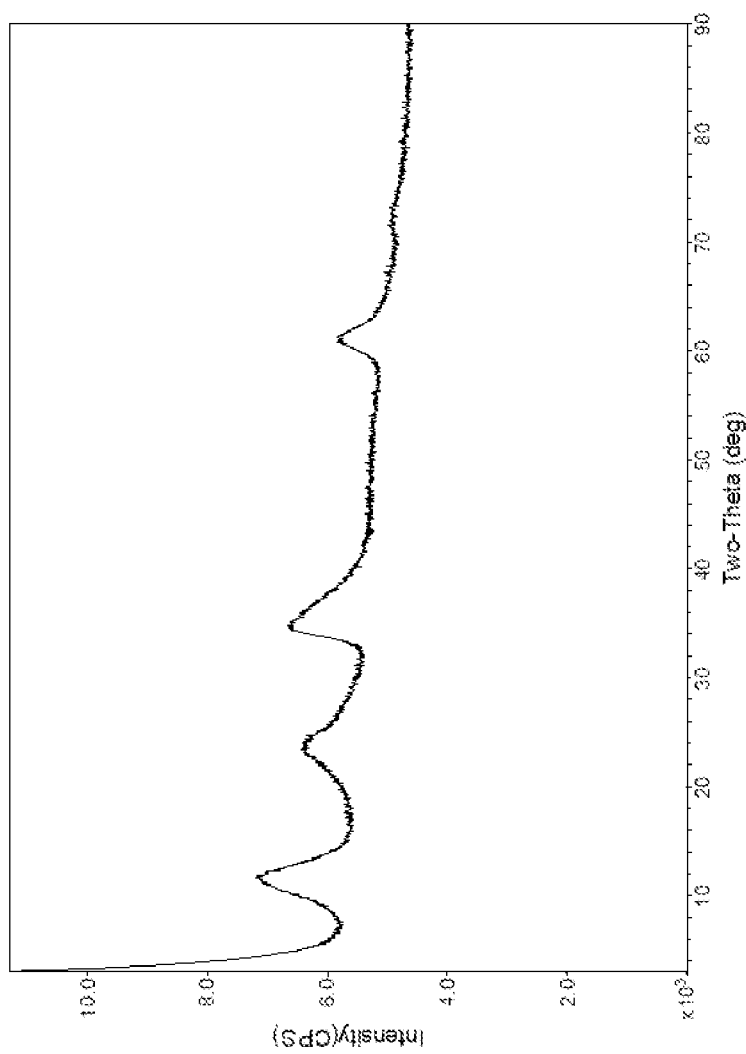
FIG. 3 is an XRD pattern of the material of example 3.

719.23 g of TMAOH and 44.53 g of aluminum-sec-butoxide were set to stir in a beaker. Then, a solution containing 154.79 g AHM, 254.87 g nickel nitrate, and 2427.93 g de-ionized water was added. The resulting slurry was stirred and digested at 100° C. for 24 h. The XRD-pattern of material generated in this example is shown in FIG. 3.

Example 4

Figure 4:
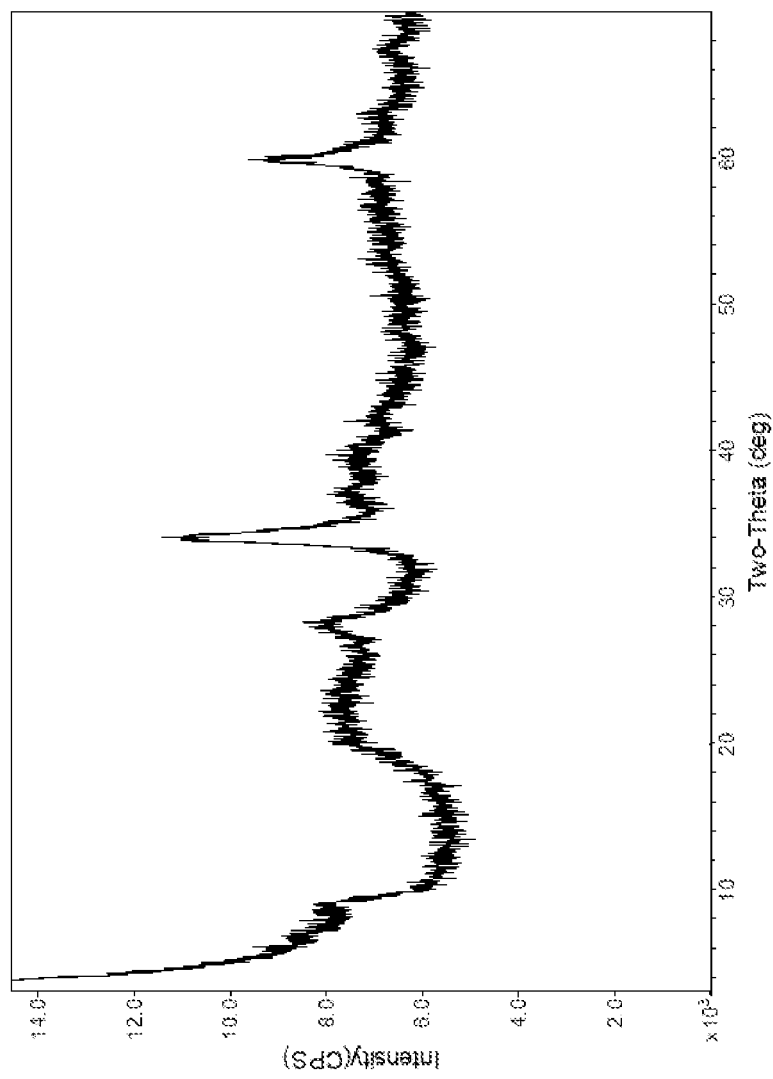
FIG. 4 is an XRD pattern of the material of example 4.

32.42 g of TMAOH and 1.33 g of a colloidal silica 40 wt.-% suspension in water (Ludox AS-40) were set to stir in a beaker. Then, a solution containing 9.28 g AHM, 7.70 g nickel nitrate, and 109.43 g de-ionized water was added. The resulting slurry was stirred and split into several portions digested at 100 or 175° C. The XRD-pattern of material generated in this example is shown in FIG. 4.

Example 5

Figure 5:
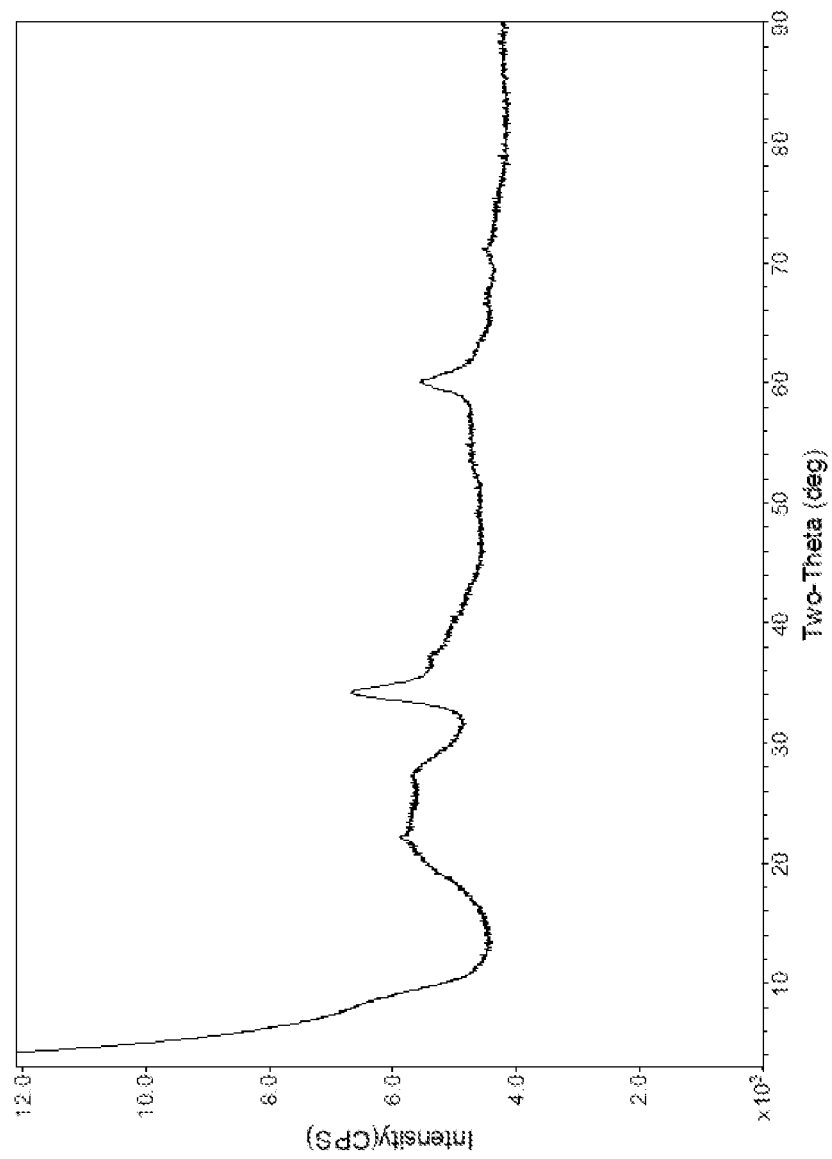
FIG. 5 is an XRD pattern of the material of example 5.

32.12 g of TMAOH and 1.17 g of a colloidal silica 40 wt.-% suspension in water (Ludox AS-40) were set to stir in a beaker. Then, a solution containing 6.91 g AHM, 11.38 g Ni nitrate, and 108.42 g di-ionized water was added. The resulting slurry was stirred and digested at 100° C. for 24 h. The XRD-pattern of material generated in this example is shown in FIG. 5.

Example 6

Figure 6:
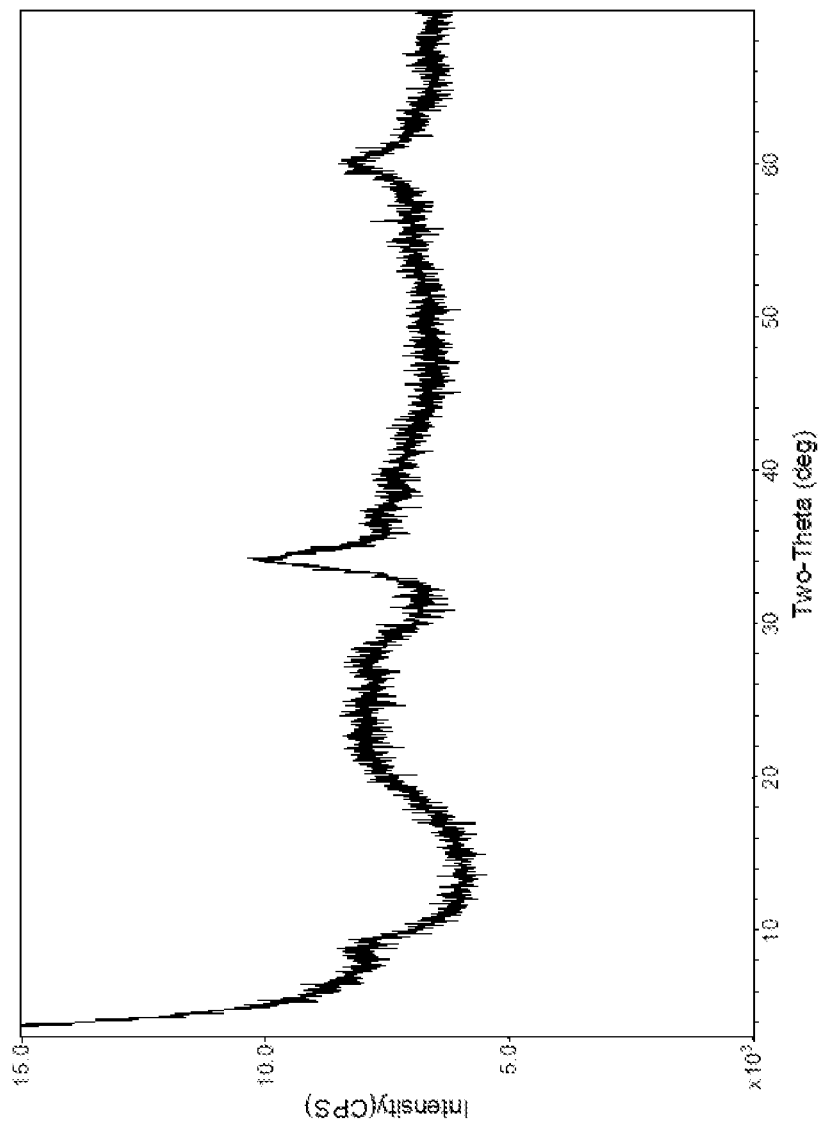
FIG. 6 is an XRD pattern of the material of example 6.

722.62 g of TMAOH and 26.43 g of a colloidal silica 40 wt.-% suspension in water (Ludox AS-40) were set to stir in a beaker. Then, a solution containing 155.52 g AHM, 256.07 g Ni nitrate, and 2439.37 g de-ionized water was added. The resulting slurry was stirred and digested at 100° C. for 3 days. The XRD-pattern of material generated in this example is shown in FIG. 6.

Example 7

Figure 7:
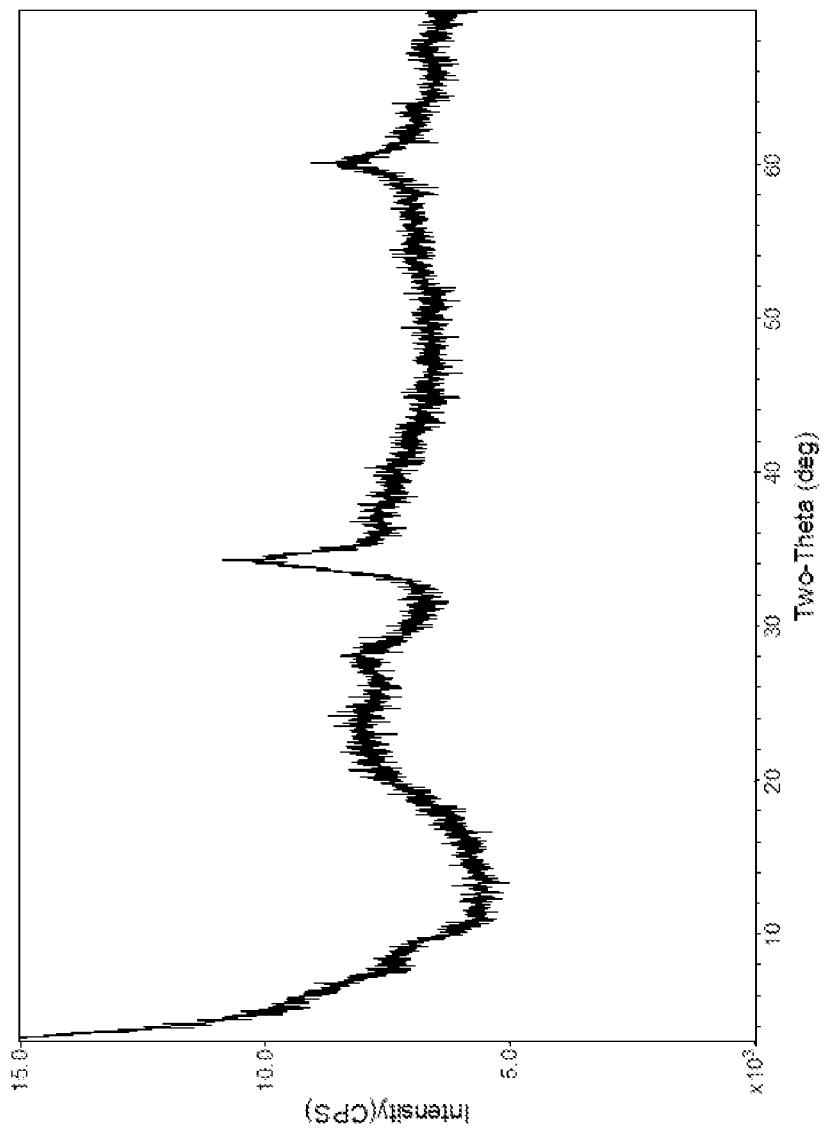
FIG. 7 is an XRD pattern of the material of example 7.

281.02 g of TMAOH and 10.28 g of a colloidal silica 40 wt.-% suspension in water (Ludox AS-40) were set to stir in a beaker. Then, a solution containing 60.48 g AHM, 99.58 g Ni nitrate, and 948.65 g de-ionized water was added. The resulting slurry was stirred and digested at 125° C. for 20 h. The XRD-pattern of material generated in this example is shown in FIG. 7.

The recovered materials generated in Examples 1 through 7 were each analyzed by several analytical methods and determined to be within the formula and description set forth above and in the claims. Analytical methods included Inductively Coupled Plasma-Optical Emission Spectrometry (ICP-OES) as described in UOP Method 1020-17; Loss on Ignition (LOI) for Fresh, Regenerated, Used, and Spent Catalysts, Catalyst Supports, and Adsorbents as described in UOP Method 954; Standard Test Methods for Instrumental Determination of Carbon, Hydrogen, and Nitrogen in Petroleum Products and Lubricants as described in ASTM method D5291.

Embodiments

A first embodiment is a mixed transition metal oxide material having the formula:

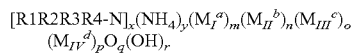

where:

$M_I$ is a metal or mixture of metals selected from Group IB (IUPAC Group 11), Group IIB (IUPAC Group 12), Group VIIB (IUPAC Group 7), and Group IVB (IUPAC Group 4);

$M_{II}$ is a metal or a mixture of metals selected from Group VIII (IUPAC Groups 8, 9, and 10);

$M_{III}$ is a metal selected from Group VIB (IUPAC Group 6);

$M_{IV}$ is an element selected from Group IIIA (IUPAC Group 13) or Group IVA (IUPAC Group 14);

[R1 R2 R3 R4-N] is a tetra-alkyl ammonium cation with one positive charge, where R1, R2, R3 and R4 are alkyl groups having from 1 to 6 carbon atoms and R1, R2, R3 and R4 can be the same or different from each other;

wherein m/(m+n)≥0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

wherein the material is further characterized by an X-ray diffraction pattern, which is essentially amorphous with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein the listed peaks have a full width at half maximum greater than 0.75°. The first embodiment may comprise wherein the mixed transition metal oxide material is present in a mixture with at least one binder and wherein the mixture comprises up to 80 wt % binder. The binder may be selected from silicas, aluminas, silica-aluminas, titanias, zirconias, natural clays, synthetic clays, and mixtures thereof. $M_I$ may be Zr, Mn, Cu, Zn, or any mixture thereof. Mn may be Fe, Co, Ni, or any mixture thereof. $M_{III}$ may be Cr, Mo, or W. The first embodiment may comprise wherein the novel mixed transition metal oxide material is sulfided.

A second embodiment is a method of making a mixed transition metal oxide material having the formula:

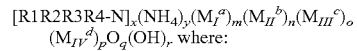
where:

$M_I$ is a metal or mixture of metals selected from Group IB (IUPAC Group 11), Group IIB (IUPAC Group 12), Group VIIB (IUPAC Group 7), and Group IVB (IUPAC Group 4);

$M_{II}$ is a metal or a mixture of metals selected from Group VIII (IUPAC Groups 8, 9, and 10);

$M_{III}$ is a metal selected from Group VIB (IUPAC Group 6);

$M_{IV}$ is an element selected from Group IIIA (IUPAC Group 13) or Group IVA (IUPAC Group 14);

[R1 R2 R3 R4-N] is a tetra-alkyl ammonium cation with one positive charge, where R1, R2, R3 and R4 are alkyl groups having from 1 to 6 carbon atoms and R1, R2, R3 and R4 can be the same or different from each other;

wherein m/(m+n)≥0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

wherein material is further characterized by an X-ray diffraction pattern, which is essentially amorphous with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein the listed peaks have a full width at half maximum greater than 0.75° the method comprising:

(a) adding sources of $M_I$, $M_{II}$, $M_{III}$, and $M_{IV}$, to at least one short-chain alkyl quaternary ammonium hydroxide compound having the formula [R1 R2 R3 R4-N]OH, where R1, R2, R3 and R4 are alkyl radicals having 1 to 6 carbon atoms, and R1, R2, R3 and R4 can be the same or different to form a reaction mixture wherein the reaction mixture does not contain additional NH$_3$.H$_2$O or other basic solutions;

(b) reacting the reaction mixture at a temperature from about 25° C. to about 200° C. for a period of time from about 30 minutes to 200 hours to generate the mixed transition metal oxide material; and (c) recovering the mixed transition metal oxide material.

The second embodiment may comprise wherein the reaction mixture is a slurry. The second embodiment may further comprise adding a binder to the reaction mixture or to the recovered mixed transition metal oxide material. In the second embodiment the binder may be selected from aluminas, silicas, alumina-silicas, titanias, zirconias, natural clays, synthetic clays, and mixtures thereof. The second embodiment may further comprise sulfiding at least a portion of the recovered mixed transition metal oxide material. The second embodiment may comprise wherein the reacting is conducted under atmospheric pressure or autogenous pressure. The second embodiment may comprise wherein the recovering is by decantation, filtration, or centrifugation. The second embodiment may comprise continuous or intermittent mixing during the reacting, during the adding or both during the reacting and during the adding. The second embodiment wherein the temperature is varied during the reacting.

A third embodiment is A conversion process comprising contacting a material with a sulfiding agent to convert at least a portion of the material to metal sulfides and contacting the metal sulfides with a feed at conversion conditions to generate at least one product, wherein the material comprises a mixed transition metal oxide material having the formula:

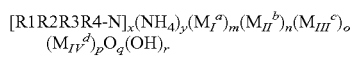

where:

$M_I$ is a metal or mixture of metals selected from Group IB (IUPAC Group 11), Group IIB (IUPAC Group 12), Group VIIB (IUPAC Group 7), and Group IVB (IUPAC Group 4);

$M_{II}$ is a metal or a mixture of metals selected from Group VIII (IUPAC Groups 8, 9, and 10);

$M_{III}$ is a metal selected from Group VIB (IUPAC Group 6);

$M_{IV}$ is an element selected from Group IIIA (IUPAC Group 13) or Group IVA (IUPAC Group 14);

[R1 R2 R3 R4-N] is a tetra-alkyl ammonium cation with one positive charge, where R1, R2, R3 and R4 are alkyl groups having from 1 to 6 carbon atoms and R1, R2, R3 and R4 can be the same or different from each other;

wherein m/(m+n)≤0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

wherein the material is further characterized by an X-ray diffraction pattern, which is essentially amorphous with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein the listed peaks have a full width at half maximum greater than 0.75°. The third embodiment may comprise wherein the conversion process is hydroprocessing. Third embodiment where the conversion process is hydrodenitrification, hydrodesulfurization, hydrodemetallation, hydrodesilication, hydrodearomatization, hydroisomerization, hydrotreating, hydrofining, or hydrocracking. The third embodiment may comprise wherein the mixed transition metal oxide material is present in a mixture with at least one binder and wherein the mixture comprises up to about 80 wt % binder.

The invention claimed is:

1. A mixed transition metal oxide material having the formula:

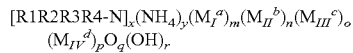

where:
- $M_I$ is a metal or mixture of metals selected from Group IB (IUPAC Group 11), Group IIB (IUPAC Group 12), Group VIIB (IUPAC Group 7), and Group IVB (IUPAC Group 4);
- $M_{II}$ is a metal or a mixture of metals selected from Group VIII (IUPAC Groups 8, 9, and 10);
- $M_{III}$ is a metal selected from Group VIB (IUPAC Group 6);
- $M_{IV}$ is an element selected from Group IIIA (IUPAC Group 13) or Group IVA (IUPAC Group 14);
- [R1 R2 R3 R4-N] is a tetra-alkyl ammonium cation with one positive charge, where R1, R2, R3 and R4 are alkyl groups having from 1 to 6 carbon atoms and R1, R2, R3 and R4 can be the same or different from each other;

wherein $m/(m+n) \geq 0$ and $m/(m+n) \leq 1$, wherein $(m+n)/o$ is from 1/10 to 10/1, wherein $o>0$, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

and
wherein the material is further characterized by an X-ray diffraction pattern, with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein the listed peaks have a full width at half maximum greater than 0.75°.

2. The mixed transition metal oxide material of claim 1 wherein $M_I$ is Zr, Mn, Cu, Zn, or any mixture thereof.

3. The mixed transition metal oxide material of claim 1 wherein $M_{II}$ is Fe, Co, Ni, or any mixture thereof.

4. The mixed transition metal oxide material of claim 1 wherein $M_{III}$ is Cr, Mo, or W.

5. The mixed transition metal oxide material of claim 1 wherein the mixed transition metal oxide material is sulfided.

6. A method of making a mixed transition metal oxide material having the formula:

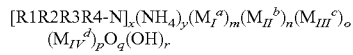

where:
- $M_I$ is a metal or mixture of metals selected from Group IB (IUPAC Group 11), Group IIB (IUPAC Group 12), Group VIIB (IUPAC Group 7), and Group IVB (IUPAC Group 4);
- $M_{II}$ is a metal or a mixture of metals selected from Group VIII (IUPAC Groups 8, 9, and 10);
- $M_{III}$ is a metal selected from Group VIB (IUPAC Group 6);
- $M_{IV}$ is an element selected from Group IIIA (IUPAC Group 13) or Group IVA (IUPAC Group 14); and
- [R1 R2 R3 R4-N] is a tetra-alkyl ammonium cation with one positive charge, where R1, R2, R3 and R4 are alkyl groups having from 1 to 6 carbon atoms and R1, R2, R3 and R4 can be the same or different from each other;

wherein $m/(m+n) \geq 0$ and $m/(m+n) \leq 1$, wherein $(m+n)/o$ is from 1/10 to 10/1, wherein $o>0$, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

wherein material is further characterized by an X-ray diffraction pattern, with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein the listed peaks have a full width at half maximum greater than 0.75° the method comprising:
a) adding sources of $M_I$, $M_{II}$, $M_{III}$, and $M_{IV}$, to at least one short-chain alkyl quaternary ammonium hydroxide compound having the formula [R1 R2 R3 R4-N]OH, where R1, R2, R3 and R4 are alkyl radicals having 1 to 6 carbon atoms, and R1, R2, R3 and R4 can be the same or different to form a reaction mixture wherein the reaction mixture does not contain additional $NH_3 \cdot H_2O$ or other basic solutions;
(b) reacting the reaction mixture at a temperature from about 25° C. to about 200° C. for a period of time from about 30 minutes to 200 hours to generate the mixed transition metal oxide material; and
(c) recovering the mixed transition metal oxide material.

7. The method of claim 6 wherein the reaction mixture is a slurry.

8. The method of claim 6 further comprising adding a binder to the reaction mixture or to the recovered mixed transition metal oxide material.

9. The method of claim 8 wherein the binder is selected from aluminas, silicas, alumina-silicas, titanias, zirconias, natural clays, synthetic clays, and mixtures thereof.

10. The method of claim 6 further comprising sulfiding at least a portion of the recovered mixed transition metal oxide material.

11. The method of claim 6 wherein the reacting is conducted under atmospheric pressure or autogenous pressure.

12. The method of claim 6 wherein the recovering is by decantation, filtration, or centrifugation.

13. The method of claim 6 further comprising continuous or intermittent mixing during the reacting, during the adding or both during the reacting and during the adding.

14. The method of claim 6 wherein the temperature is varied during the reacting.

15. A conversion process comprising contacting a material with a sulfiding agent to convert at least a portion of the material to metal sulfides and contacting the metal sulfides with a feed at conversion conditions to generate at least one product, wherein the material comprises a mixed transition metal oxide material having the formula:

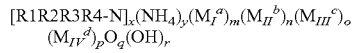

where:
- $M_I$ is a metal or mixture of metals selected from Group IB (IUPAC Group 11), Group IIB (IUPAC Group 12), Group VIIB (IUPAC Group 7), and Group IVB (IUPAC Group 4);
- $M_{II}$ is a metal or a mixture of metals selected from Group VIII (IUPAC Groups 8, 9, and 10);
- $M_{III}$ is a metal selected from Group VIB (IUPAC Group 6);
- $M_{IV}$ is an element selected from Group IIIA (IUPAC Group 13) or Group IVA (IUPAC Group 14); and
- [R1 R2 R3 R4-N] is a tetra-alkyl ammonium cation with one positive charge, where R1, R2, R3 and R4 are alkyl groups having from 1 to 6 carbon atoms and R1, R2, R3 and R4 can be the same or different from each other;

wherein m/(m+n)≥0 and m/(m+n)≤1, wherein (m+n)/o is from 1/10 to 10/1, wherein o>0, wherein x, p, and r are each greater than 0, wherein y is greater than or equal to 0, and a, b, c, d, x, y, m, n, o, p, q, and r satisfy the equation:

$$x*(+1)+y*(+1)+a*m+b*n+c*o+d*p+q*(-2)+r*(-1)=0$$

and wherein the material is further characterized by an X-ray diffraction pattern, with crystalline peaks shown in Table A if $M_{IV}$ is Al or Table S if $M_{IV}$ is Si:

TABLE A

| 2θ (°) | d (Å) | 100(I/I$_o$) |
|---|---|---|
| 7.5-16.0 | 11.781-5.563 | s-vs |
| 18.5-30.0 | 4.742-2.995 | m-s |
| 32.0-41.5 | 2.793-2.181 | vs |
| 58.0-65.0 | 1.582-1.431 | m-s |

TABLE S

| 2θ (°) | d (Å) | 100(I/I$_o$) |
|---|---|---|
| 5.50-11.0 | 14.981-7.981 | w-m |
| 32.0-36.5 | 2.746-2.476 | vs |
| 58.0-62.5 | 1.587-1.485 | m-s | wherein the listed peaks have a full width at half maximum greater than 0.75°.

16. The process of claim 15 wherein the conversion process is hydroprocessing.

17. The process of claim 16 wherein the conversion process is selected from hydrodenitrification, hydrodesulfurization, hydrodemetallation, hydrodesilication, hydrodearomatization, hydroisomerization, hydrotreating, hydrofining, and hydrocracking.

18. The process of claim 15 wherein the mixed transition metal oxide material is present in a mixture with at least one binder and wherein the mixture comprises up to about 80 wt % binder.

* * * * *